United States Patent [19]

Hartmeyer

[11] Patent Number: 5,064,218
[45] Date of Patent: Nov. 12, 1991

[54] AIR CUSHION RESTRAINT DEVICE HAVING REINFORCED INFLATION ATTACHMENT

[75] Inventor: James Hartmeyer, St. Clair Shores, Mich.

[73] Assignee: Takata, Inc., Auburn Hills, Mich.

[21] Appl. No.: 559,662

[22] Filed: Jul. 30, 1990

Related U.S. Application Data

[63] Continuation-in-part of Ser. No. 392,642, Aug. 11, 1989, Pat. No. 4,988,119, which is a continuation-in-part of Ser. No. 257,971, Oct. 14, 1988, abandoned.

[51] Int. Cl.$^5$ .............................................. B60R 21/08
[52] U.S. Cl. ................................... 280/743; 280/731; 280/732
[58] Field of Search ................ 280/730, 731, 732, 743

[56] References Cited

U.S. PATENT DOCUMENTS

| | | | |
|---|---|---|---|
| 3,810,523 | 5/1974 | Yamaguchi et al. | 280/739 |
| 4,111,457 | 9/1978 | Kob et al. | 280/728 |
| 4,286,954 | 9/1981 | McArthur et al. | 280/743 |
| 4,793,631 | 12/1988 | Takada | 280/743 |
| 4,817,828 | 4/1989 | Goetz | 280/736 |
| 4,828,286 | 5/1989 | Fohl | 280/731 |
| 4,907,819 | 3/1990 | Cuevas | 280/743 |
| 4,913,461 | 4/1990 | Cuevas | 280/731 |
| 4,934,734 | 6/1990 | Takada | 280/731 |
| 4,943,027 | 7/1990 | Nakayama | 280/743 |

Primary Examiner—Kenneth R. Rice
Attorney, Agent, or Firm—Harness, Dickey & Pierce

[57] ABSTRACT

An air cushion restraint system (ACRS) providing enhancements in the strength of the attachment between an air bag and associated support structure and further providing improvements in the fabrication and assembly of such systems. ACRS systems in accordance with this invention incorporate an air bag with a retainer ring member which reinforces the inflation or mounting opening which is provided to enable inflation gases to be vented into the bag and to mount the bag to the associated vehicle structure. The retainer ring is sewn directly to the air bag at the inflation opening and is preferably made of a polymeric material. In a preferred embodiment the retainer ring features projecting post members which enter and engage with apertures in a corresponding mounting structure to prevent the air bag from pulling away from the attachment structures during depolyment

28 Claims, 3 Drawing Sheets

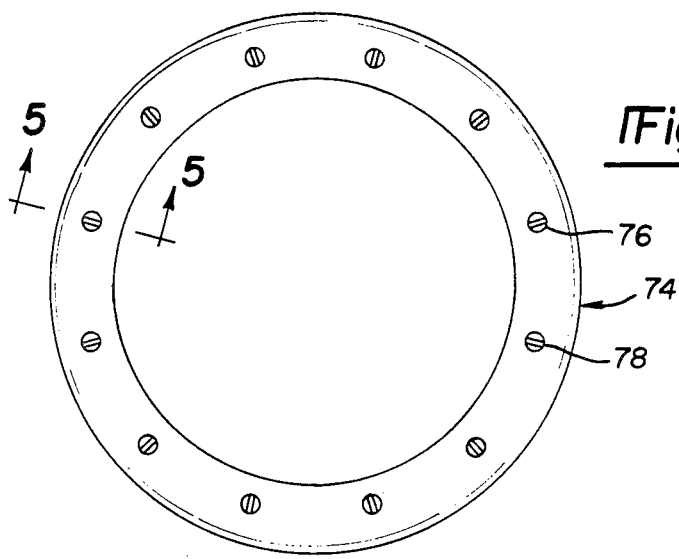
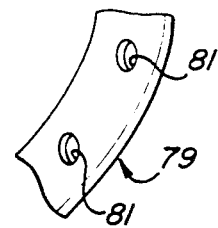
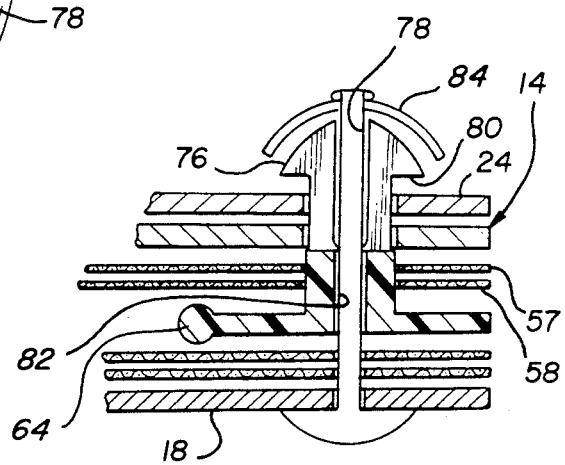
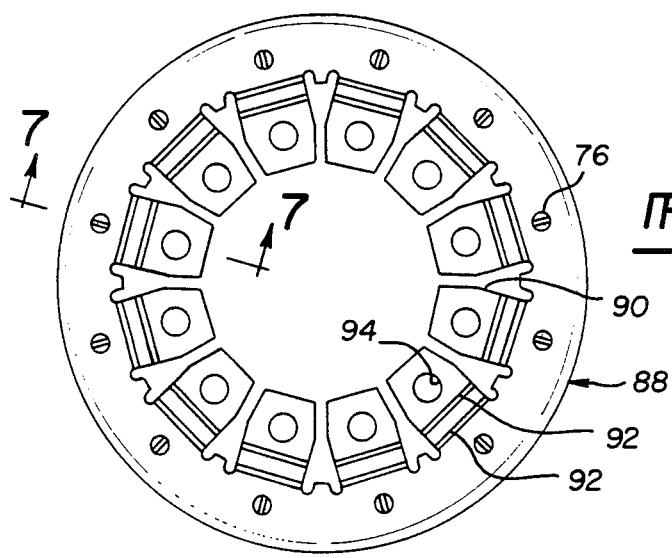
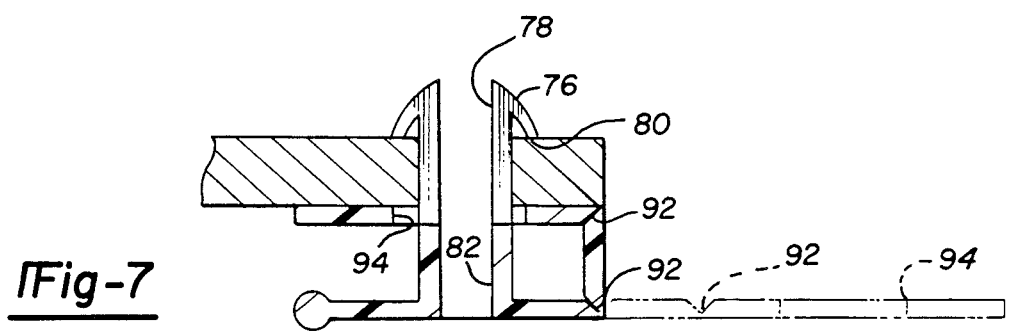

AIR CUSHION RESTRAINT DEVICE HAVING REINFORCED INFLATION ATTACHMENT

CROSS REFERENCE TO RELATED APPLICATIONS

This application is a continuation-in-part of corresponding U.S. patent application Ser. No. 392,642 filed on Aug. 11, 1989 entitled "Vehicle Occupant Restraint System," now U.S. Pat. No. 4,988,119, which is a continuation-in-part of U.S. Patent application Ser. No. 257,971 filed on Oct. 14, 1988 also entitled "Vehicle Occupant Restraint System," now abandoned.

BACKGROUND AND SUMMARY OF THE INVENTION

This invention is related to an air cushion restraint system (ACRS) for providing vehicle occupant protection in the event of a vehicle impact, and particularly, to an air bag construction for providing enhanced strength in the area of the attachment of the air bag to the vehicle support structure.

Impact actuated inflatable occupant restraint systems typically comprise a source of a non-combustible inflating gas and a folded inflatable air bag. A crash sensor is used to detect deceleration of the vehicle due to impact and actuates the inflator. Upon inflation, the bag is deployed to provide a resilient restraint for absorbing the kinetic energy of the occupant's body within the vehicle.

In a typical air cushion restraint system configuration, the inflator unit is mounted to a vehicle support structure, and the air bag, which defines an enclosed volume for receiving the inflation gas, is also attached to the support structure. The inflation gas typically fills the air bag through an inflation gas opening or mouth. The air bag is attached to the support structure around the inflation opening, usually by being clamped between the ACRS housing and a mounting ring. Air cushion restraint systems designed for the driver's side of a motor vehicle are generally packed into the steering wheel whereas the passenger side ACRS is mounted inside the vehicle instrument panel.

Although presently available ACRS systems provide exceptional occupant protection, designers of these systems are constantly striving to increase their level of performance, efficiency, ease of manufacture, etc. One area of continuing development is that of air bag strength. During air bag inflation and when an occupant strikes an air bag, significant gas pressures are developed which impose tension stresses on the bag fabric. In order to operate properly, the air bag structural integrity must be maintained during the impact sequence. In the event that the air bag tears or breaks away from the mounting structure, excessive inflation gas loss rates can occur to the extent of reducing the effectiveness of the restraint system. In air bag testing and development, air bags are often statically pressurized with air to determine the point at which fabric failure occurs. Present U.S. Federal Motor Vehicle Safety Standards (FMVSS) require an air bag to remain intact at an air inflation pressure of at least 19 PSI. During tests to evaluate air bag strength, air bags are often pressurized to failure. The most common failure mode is a tearing of the bag from the support structure at the inflation or mounting opening mouth. Therefore, increasing the strength of the air bag at the inflation opening mouth can in many cases enable the air bag to maintain higher inflation pressures.

This invention is related to an air bag design featuring a reinforced air bag inflation or mounting opening. In accordance with the preferred embodiments of this invention, the air bag features a retainer ring, preferably made of a polymeric plastic material which is sewn to the air bag fabric circumscribing the inflation or mounting opening and includes means for engaging with the restraint support structure.

Most air bag systems in present use today require the use of a reinforcing ring or perimeter frame for clamping the air bag against a mounting structure and require a number of fasteners such as bolts or rivets to be installed around the perimeter frame. The requirement of using a large number of individual fasteners imposes cost penalties, not only due to the cost of the fasteners themselves, but also due to the labor and assembly operations required to install the fasteners.

Another aspect of the present invention is an air bag design featuring enhancements in the manner of assembly which reduce the number of discrete fasteners required around a perimeter air bag mounting frame which must be fastened, while still providing a secure connection between the air bag and the support structure.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 4 is a plan view of a retainer ring in accordance with the second embodiment of this invention.

FIG. 5 is a cross-sectional view taken along line 5—5 of FIG. 4.

FIG. 6 is a plan view of a retainer ring in accordance with a third embodiment of this invention.

FIG. 7 is a cross-sectional view taken along line 7—7 of FIG. 6.

FIG. 11 is a partial plan view of a retainer ring featuring a modification of the embodiment shown in FIG. 4.

DETAILED DESCRIPTION OF THE INVENTION

Figure 1:
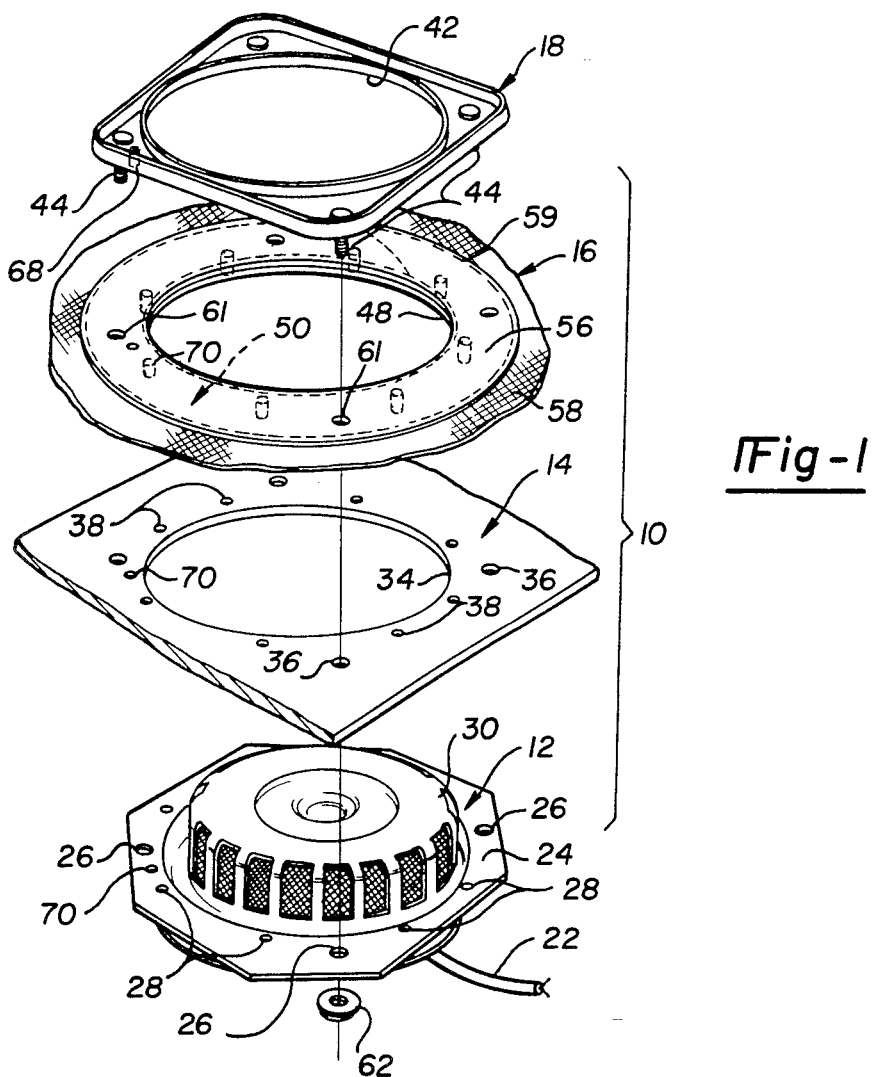
FIG. 1 is a pictorial view of an air cushion restraint system in accordance with a first embodiment of the present invention.

A pictorial view of an ACRS in accordance with a first embodiment of this invention is shown in FIG. 1 and is generally designated there by reference number 10. ACRS 10 generally comprises inflator assembly 12, support plate 14, air bag 16, and mounting ring 18.

Inflator assembly 12 contains a gas generating material which produces inflation gas when it is actuated by an electrical signal on signal line 22. Inflator assembly 12 includes a mounting flange 24 which surrounds the generally disk-shaped inflator assembly and has four fastener holes 26 to allow threaded fasteners to pass through the mounting flange. Additional fastener holes 28 ar spaced around mounting flange 24, with two of such additional fastener holes shown between each of fastener holes 26. Inflation nozzle 30 is shown positioned above mounting flange 24, with respect to the orientation of the elements shown in FIG. 1, and is the escape route for inflation gases when the inflator is actuated. The bottom side of inflator assembly 12 (not shown) is sealed so that the inflation gases generated by the unit escape through inflation nozzle 30.

Support plate 14 is designed to be securely affixed to a vehicle support structure (not shown). ACRS 10 shown in FIG. 1 is designed to be mounted to a steering column assembly of a motor vehicle to provide protection for the vehicle driver. Support plate 14 defines a central inflator opening 34. Spaced around inflator opening 34 are fastener holes 36 and an additional series of fastener holes 38, both of which are oriented to be in registry with corresponding inflator assembly fastener holes 26 and 28, respectively. Support plate 14 would have additional fastener features (not shown) to enable it to be mounted to the vehicle structure in a secure manner.

Mounting ring 18, also shown in FIG. 1 defines an inflator opening 42 and has four threaded fastener bolts 44 projecting from it in an axial direction relative to the plane of the ring. Bolts 44 are welded to or otherwise affixed to mounting ring 18. Bolts 44 are oriented to pass through the mounting plate and inflator fastener holes 36 and 26 when the ACRS unit is assembled. In a modified embodiment, rivets or other fasteners could take the place of threaded bolts 44.

Air bag 16 becomes clamped between support plate 14 and mounting ring 18 during assembly. Air bag 16 also defines an inflator or mounting opening 48 which, in accordance with the present invention, is reinforced through the use of a retainer ring 50, best shown in FIG. 2. Air bag 16 can be made from a variety of materials such as woven nylon fabric. In some applications, such as the typical driver side air bag, the air bag material is substantially gas impermeable. Resistance to gas permeability is often provided by an inside coating of a heat resistant material such as neoprene to protect the nylon fabric from the heat associated with gas generation. Depending upon the application, various degrees of permeability of the air bag material to the inflation gases are selected. Often it is desirable to provide a controlled deflation of an air bag after deployment. Such controlled leakage of gas can be provided by the selection of air bag material for its permeability or through the use of vent or exhaust holes in the bag. Exhaust holes are used for an air bag made of a relatively gas impermeable material and provides post accident ventilation of the air bag interior volume while retaining the capacity of the air bag to restrain the occupant during impact. Air bag 16 may also include additional features (not shown) such as tethers, which are internal fabric ribbons or sheets which are used to control the inflated shape of the bag.

Figure 3:
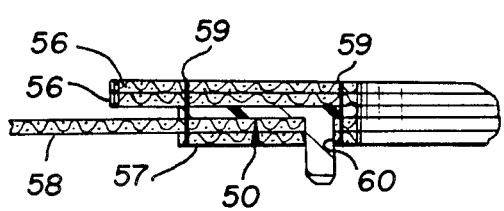
FIG. 3 is a cross-sectional view showing the layers of material which are sewn around the air bag inflation opening and through the retainer ring of the embodiment shown in FIGS. 1 and 2.

Retainer ring 50 is preferably made from a polymeric plastic material such as Dupont Zytel ST801 nylon and features an inside opening diameter which generally corresponds with air bag inflator opening 48. Retainer ring 50 is semi-rigid and non-porous and is preferably formed as an unitary product by an injection molding. Four fastener holes 52 are provided around the perimeter of the retainer ring 50 in registry with the position of support plate bolts 44. Between fastener holes 52, retainer ring 50 features a pair of projecting posts 54 integrally formed with the retainer ring. Posts 54 project in an axial direction relative to the plane of the retainer ring and are oriented to pass through inflator holes 28 and support plate holes 38. The perimeter of air bag inflation opening 48 includes a pair of fabric rings 56 overlying the retainer ring on the inside of the bag, and another fabric ring 57 on the outside of the bag. Rings 56 and 57 may be made of the same woven material which comprises air bag body portion 58. Fabric rings 56 and 57, and retainer ring 50 are sewn to air bag body portion 58, as shown in FIG. 3, along stitching lines 59. Fabric ring 57 and body portion 58 also includes apertures 60 for the passage of the posts 54. The fabric layers comprising air bag 16 also include apertures 61 for the passage of bolts 44.

Returning again to FIG. 1, the manner of assembly of the components comprising ACRS 10 will be described. The components are oriented so that mounting bolts 44 pass through the corresponding apertures through air bag 16, retainer ring 50, support plate 14, and inflator assembly 12. Nuts 62 are then installed to secure the components together and firmly clamp air bag 16 between mounting ring 18 and support plate 14. As the parts are mated together, posts 54 pass through the corresponding apertures through support plate 14 and inflator assembly 12. In an alternate design of inflator 30, the inflator mounting flange 24 would have only holes 26, with the retainer ring posts 54 being received only be mounting plate fastener holes 38. Unlike prior ACRS constructions, there is no need to provide additional fasteners such as rivets or additional threaded bolts in order to provide strength for the air bag in the area of inflation opening 48. In the event that ACRS 10 is deployed, tension loads on the fabric which forms air bag body portion 58 are restrained, not only by the threaded fasteners bolts 44, but also by posts 54 which become loaded in shear. Since the retainer ring is fastened to the remainder of the air bag 16 through stitching, a high degree of load transfer of the bag fabric to posts 54 is provided.

The inclusion of retainer ring 50 for air bag 16 significantly reduces the complexity of air bag assembly since it is only necessary to fit posts 54 within the corresponding apertures and, therefore, securing individual fasteners in the location of posts 54 is unnecessary. The posts 54 loosely fit within the corresponding holes so as to facilitate assembly. However, in some manufacturing sequences it may be desirable to insure that the retainer ring posts 54 are properly oriented within the corresponding apertures before nuts 62 are secured. To provide such securement, tinnerman nuts or similar fasteners (not shown) could be used for one or more of posts 54.

Figure 2:
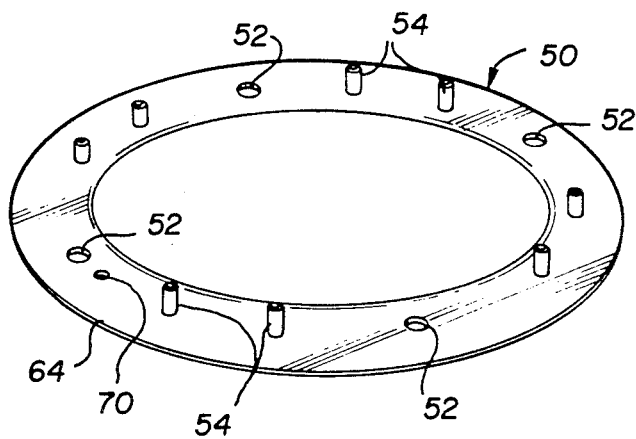
FIG. 2 is a pictorial view of a retainer ring in accordance with a first embodiment of this invention used in the air bag shown in FIG. 1.

Additional features of the design of retainer ring 50 are also shown in FIG. 2. Retainer ring 50 includes a bead 64 along its outer periphery. Bead 64 presents a smooth edge which prevents cutting or abrading of the air bag fabric in that area. In some air cushion designs and especially those featuring internal tethers which control the inflated shape of the bag or in cases where vent holes are provided which must be oriented in a particular position, it is desirable to provide a predetermined indexing or rotational orientation of the air bag with respect to support plate 14. For this purpose, indexing post 68 is provided which projects from mounting ring 18 and passes through corresponding holes 70 through the air bag 16, support plate 14, and inflator assembly 12. Since only a single indexing post is provided, the components can only be assembled in one particular indexed position.

FIGS. 4 and 5 illustrate a retainer ring 74 in accordance with the second embodiment of this invention. Retainer ring 74 differs from retainer ring 50 in that the projecting posts 76 have a lateral slot 78 and projecting tabs or ears 80 which allow the posts to enter the corresponding apertures and snap-fit into position during assembly to hold the parts together. Retainer ring 74 also differs in that posts 76 have axial holes 82 through them so that a rivet 84 can be installed through the posts, thereby eliminating the use of threaded fasteners in separate holes as shown in conjunction with the first embodiment. In one design of this embodiment four rivets 84 would be used for securing the components of an ACRS together in accordance with this invention. FIG. 5 shows retainer ring 74 shown with the elements of FIG. 1 and further showing the installation of rivet 84 through post 76. In all other respects, an ACRS incorporating retainer ring 74 would be similar in design and operation to that shown in FIGS. 1, 2 and 3. A modification of retainer ring 74 shown in FIG. 11 and designated by reference number 79 would feature holes 81 in the place of each of posts 76, and conventional fastener would be installed through them for securing the components together. Such a design would provide a strengthening of the air bag opening without the assembly features of the other embodiments.

FIGS. 6 and 7 illustrate a third embodiment of a retainer ring 88 in accordance with the present invention which is substantially identical to retainer ring 74 except that it features tabs 90 associated with each of posts 76 which can be folded outwardly along fold lines 92 and have aperture 94 which allows the tabs to be folded over post 76 as shown in FIG. 7. FIG. 7 shows the position of the tabs in phantom lines as the retainer ring is initially formed as shown in FIG. 6, and also shows in full lines the tabs after being folded over and into engagement with post 76. The function of tabs 90 is to provide additional protection for the edges of the air bag material around inflation opening 48 from damage due to the hot inflation gases issuing from inflator nozzle 30. Elements of retainer ring 88 equivalent to those of the prior embodiments are identified by like reference numbers.

Figure 8:
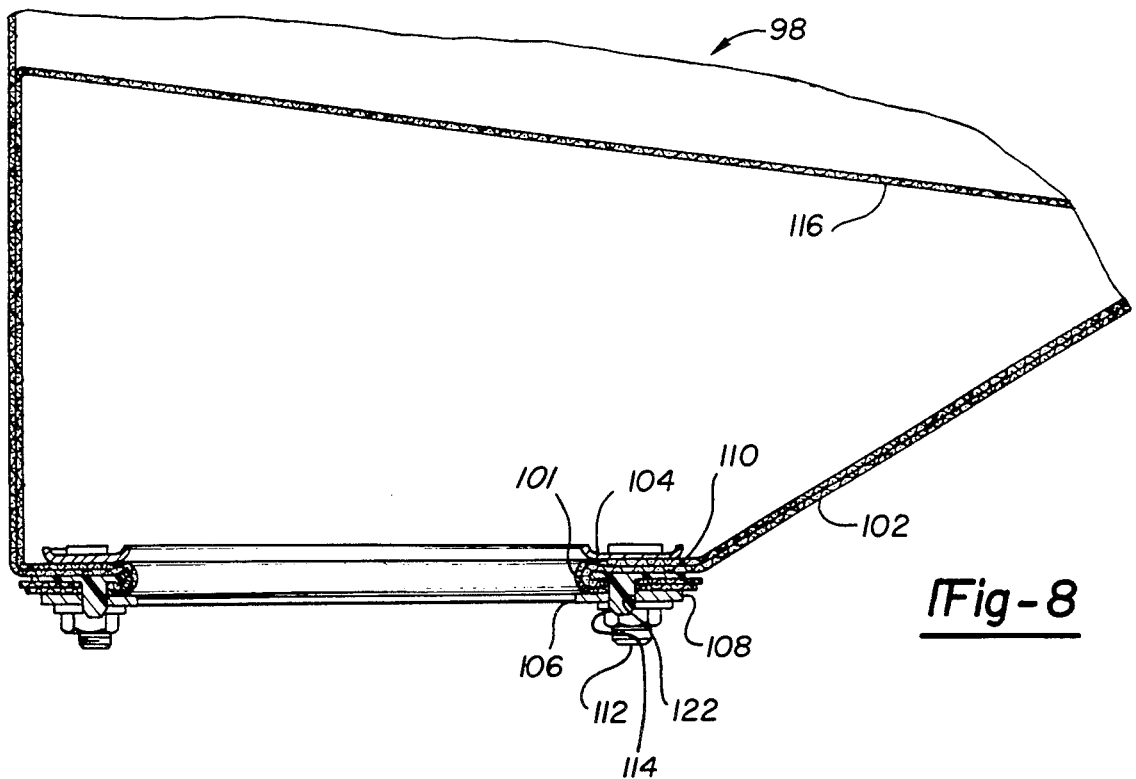
FIG. 8 is a cross-sectional view of an air cushion restraint system according to an alternate embodiment of this invention particularly adapted for application for the passenger side front seat of a motor vehicle.
Figure 9:
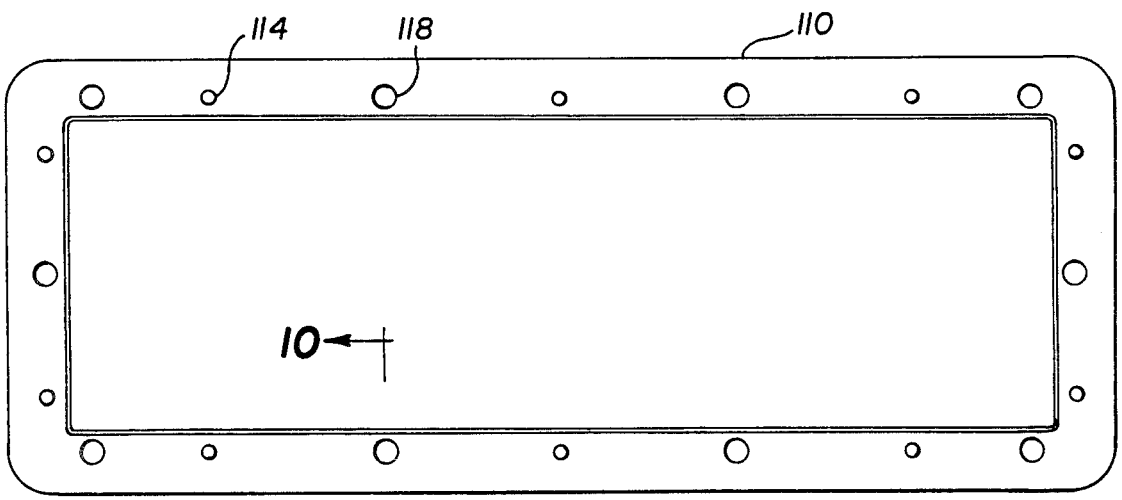
FIG. 9 is a plan view of a retainer ring adapted for use with the air cushion device shown in FIG. 8.
Figure 10:
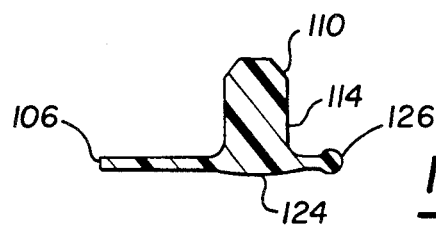
FIG. 10 is a cross-sectional view taken along line 10—10 from FIG. 9.

FIGS. 8 through 10 illustrate an ACRS unit 98 incorporating features of the present invention which is particularly adapted for use as a passenger side restraint system. ACRS 98 is conceptually equivalent to the prior embodiments except that the inflation or mounting opening 101 of air bag 102 is rectangular as opposed to circular in shape. Consequently, mounting ring 104 has a rectangular configuration as does inflation opening 106 of support structure 108. FIG. 9 provides a plan view of rectangular retainer ring 110 which is made from a material such as a polymeric plastic like that used with the prior described embodiments. Due to the large perimeter size of inflation opening 106, it is believed necessary to provide clamping engagement between the air bag mounting components or more intervals as compared with the prior embodiments such as the first embodiment in which only four threaded fasteners are provided. For this embodiment the fasteners alternate between threaded fastener bolts 112 and projecting retainer ring posts 114.

Air bag 102 is shown having an internal tether 116 to control the shape of the air bag upon inflation. The material comprising air bag 102 is wrapped around retainer ring 110 as shown in FIG. 8 and is stitched through to secure the retainer ring. For this embodiment, a total of ten securing bolts 112 are provided around the periphery of mounting ring 104. Retainer ring 110 features apertures 118 which corresponds to the position of bolts 112. Similarly, support structure 108 also features apertures 120 aligned with bolts 112. Between adjacent apertures 118, retainer ring 110 features post 114 which project through corresponding apertures 122 of support structure 108.

Although the embodiment of ACRS 98 still requires a number of threaded fasteners or other clamping fasteners such as rivets, it nonetheless provides a substantial reduction in the number required and provides the reinforcements to inflation opening 101 which is desirable as described previously. Although not shown, support structure 108 would be in the form of an enclosed housing having an inflator assembly mounted inside it. FIG. 10 is a cross-sectional view showing that the retainer ring has a dome area 24 on the opposite surface from post 114 which is provided for the purpose of accommodating shrinkage or sink tendency of the plastic material in the area of post 114 due to its increased section thickness in that area. The Figure also shows a bead 126 for compressing the air bag material as discussed above.

While the above description constitutes the preferred embodiments of the present invention, it will be appreciated that the invention is susceptible of modification, variation and change without departing from the proper scope and fair meaning of the accompanying claims.

I claim:

1. An air cushion occupant restraint system for a motor vehicle of the type having an inflator for generating an inflation gas, comprising:

an air bag defining an internal volume which is filled with said inflation gas in the event of vehicle impact, said air bag including an inflation gas opening for enabling said inflator to discharge said inflation gas into said air bag, said air bag including a retainer ring affixed to said air bag generally circumscribing said inflation gas opening and having a plurality of posts arranged around said retainer ring, and mounting means for securing said air bag to said vehicle including a support structure coupled to said motor vehicle and a clamping ring which cooperate to clamp said air bag and said retainer ring between said support structure and said clamping ring around said inflation gas opening, and wherein at least one of said support structure or said clamping ring includes a plurality of apertures which receive said retainer ring posts.

2. An air cushion occupant restraint system according to claim 1 wherein said posts project in an axial direction relative to the plane defined by said inflation gas opening.

3. An air cushion occupant restraint system according to claim 2 wherein said retainer ring has a generally flat disc portion with said posts extending from at least one of the two opposing face surfaces formed by said disc portion.

4. An air cushion occupant restraint system according to claim 1 wherein said mounting means further comprises one or more threaded fasteners for clamping said support structure and said clamping ring together.

5. An air cushion occupant restraint system according to claim 1 wherein said mounting means further comprises one or more rivets for clamping said support structure and said clamping ring together.

6. An air cushion occupant restraint system according to claim 1 wherein at least one of said posts means defines ears to enable said retainer ring to snap into engagement with said apertures.

7. An air cushion occupant restraint system according to claim 1 wherein said at least one of said posts has an axially extending bore therethrough and wherein a fastener is disposed through said bore for securing said air bag to said mounting means.

8. An air cushion occupant restraint system according to claim 1 wherein said retainer ring further defines a plurality of flaps which are folded from the center of said ring with holes for receiving said posts.

9. An air cushion occupant restraint system according to claim 1 wherein said air bag inflation gas opening is further reinforced with one or more rings of fabric material sewn to said air bag and circumscribing said inflation gas opening.

10. An air cushion occupant restraint system according to claim 1 wherein said retainer ring is sewn to said air bag.

11. An air cushion occupant restraint system according to claim 1 wherein said retainer ring is made from a polymeric plastic material.

12. An air cushion occupant restraint system for a motor vehicle of the type having an inflator for generating an inflation gas, comprising:
an air bag defining an internal volume which is filled with said inflation gas in the event of vehicle impact, said air bag including an inflation gas opening for enabling said inflator to discharge a retainer ring made from a polymeric plastic material affixed to said air bag generally circumscribing said inflation gas opening and having a plurality of posts arranged around said retainer ring, and
mounting means for securing said air bag to said vehicle including first and second support members which cooperate to clamp against opposing sides of said air bag and said retainer ring around said inflation gas opening, and wherein at least one of said support members includes a plurality of apertures which receive said retainer ring posts.

13. An air cushion occupant restraint system for a motor vehicle comprising:
an inflator assembly for generating an inflation gas in the event of vehicle impact, said inflator assembly having a radially projecting perimeter flange,
an air bag defining an internal volume which is filled with said inflation gas in the event or vehicle impact, said air bag including an inflation gas opening for enabling said inflator to discharge said inflation gas into said air bag, said air bag including a retainer ring affixed to said air bag generally circumscribing said inflation gas opening and having a plurality of posts arranged around said retainer ring,
a support plate having an inflation opening corresponding with said air bag inflation opening and having apertures for receiving said retainer ring posts,
a clamping ring circumscribing said air bag inflation opening, and
securing means for attaching together said inflator assembly, said support plate and said clamping ring and for clamping said opposing surfaces of said air bag around said inflation opening.

14. An air cushion occupant restraint system according to claim 13 wherein said posts project in an axial direction relative to the plane defined by said inflation gas opening.

15. An air cushion occupant restraint system according to claim 14 wherein said retainer ring has a generally flat disc portion with said posts extending from at least one of the two opposing face surfaces formed by said disc portion.

16. An air cushion occupant restraint system according to claim 13 wherein said securing means comprises one or more threaded fasteners.

17. An air cushion occupant restraint system according to claim 13 wherein said securing means comprises one or more rivets.

18. An air cushion occupant restraint system according to claim 13 wherein at least one of said posts defines ears to enable said retainer ring to snap into engagement with said support plate.

19. An air cushion occupant restraint system according to claim 13 wherein at least one of said posts has an axially extending bore therethrough and wherein said securing means comprises a fastener disposed through said bore.

20. An air cushion occupant restraint system according to claim 13 wherein said retainer ring further defines a plurality of flaps which are folded from the center of said retaining ring to overlie said ring with holes for receiving said posts.

21. An air cushion occupant restraint system according to claim 13 wherein said air bag inflation gas opening is further reinforced with one or more rings of fabric material sewn to said air bag.

22. An air cushion occupant restraint system according to claim 13 wherein said retainer ring is sewn to said air bag.

23. An air cushion restraint system according to claim 13 wherein said retainer ring is made from a polymeric plastic material.

24. An air cushion occupant restraint system for a motor vehicle of the type having an inflator for generating an inflation gas, comprising:
an air bag defining an internal volume which is filled with said inflation gas in the event of vehicle impact, said air bag including an inflation gas opening for enabling said inflator to discharge said inflation gas into said air bag, said air bag including a retainer ring made from a polymeric material which generally circumscribes said inflation gas opening and is secured to said air bag by stitching around said inflation gas opening,
mounting means for securing said air bag to said vehicle including first and second support members which cooperate to clamp against opposing sides of said air bag and said retainer ring around said inflation gas opening, and post means for mechanically linking said mounting means to said air bag and said retainer ring to resist said air bag at said inflation gas opening from pulling away from said mounting means in response to inflation gas pressure inside said air bag during deployment.

25. An air cushion occupant restraint system according to claim 24 wherein said mounting means comprises threaded fasteners.

26. An air cushion occupant restraint system according to claim 24 wherein said mounting means comprises rivets.

27. An air cushion occupant restraint system according to claim 24 wherein said post means are formed integrally by said retainer ring.

28. An air cushion occupant restraint system for a motor vehicle of the type having an inflator for generating an inflation gas, comprising:

an air bag defining an internal volume which is filled with said inflation gas in the event of vehicle impact, said air bag including an inflation gas opening for enabling said inflator to discharge said inflation gas into said air bag, said air bag including a retainer ring sewn to said air bag generally circumscribing said inflation gas opening and having a plurality of posts arranged around said retainer ring, and mounting means for securing said air bag to said vehicle including first and second support members which cooperate to clamp against opposing sides of said air bag and said retainer ring around said inflation gas opening, and wherein at least one of said support members includes a plurality of apertures which receive said retainer ring posts.

* * * * *

UNITED STATES PATENT AND TRADEMARK OFFICE
CERTIFICATE OF CORRECTION

PATENT NO. : 5,064,218
DATED : November 12, 1991
INVENTOR(S) : James Hartmeyer

It is certified that error appears in the above-indentified patent and that said Letters Patent is hereby corrected as shown below:

Column 3, line 10, "ar" should be --are--.

Column 4, line 39, "be" should be --by--.

Column 4, line 46, "fasteners" should be --fastener--.

Column 6, line 5, after "embodiment" insert --,--.

Column 7, line 44, claim 12, after "discharge" insert --said inflation gas into said air bag, said air bag including--.

Column 7, line 63, claim 13, "or" should be --of--.

Signed and Sealed this

Twenty-second Day of November, 1994

Attest:

BRUCE LEHMAN

Attesting Officer

Commissioner of Patents and Trademarks